United States Patent
Cabay et al.

(10) Patent No.: US 7,052,334 B1
(45) Date of Patent: May 30, 2006

(54) LOCKING CLAMP ASSEMBLY

(76) Inventors: Jeffrey J. Cabay, 6047 W. Seminole St., Chicago, IL (US) 60646; Ralph J. Jacobazzi, 2056 Ash St., Des Plaines, IL (US) 60018

( * ) Notice: Subject to any disclaimer, the term of this patent is extended or adjusted under 35 U.S.C. 154(b) by 0 days.

(21) Appl. No.: 10/911,016

(22) Filed: Aug. 4, 2004

(51) Int. Cl.
*H01R 4/30* (2006.01)
(52) U.S. Cl. ........................ 439/803; 411/326
(58) Field of Classification Search .............. 439/803, 439/479; 411/326; 269/90, 249, 173; 24/135 N
See application file for complete search history.

(56) References Cited

U.S. PATENT DOCUMENTS

| | | |
|---|---|---|
| 1,204,548 A | 11/1916 | Dixon |
| 1,404,023 A | 1/1922 | Hare |
| 1,406,315 A | 2/1922 | Whittaker |
| 1,454,712 A | 5/1923 | Ellis |
| 1,457,736 A | 6/1923 | Johnson |
| 1,463,622 A * | 7/1923 | Lummer ............... 411/326 |
| 1,549,587 A | 8/1925 | Baldwin |
| 1,700,334 A | 1/1929 | Puterbaugh |
| 2,316,073 A | 4/1943 | Kellogg |
| 2,424,037 A | 7/1947 | Jenkins |
| 2,755,681 A | 7/1956 | Merriman |
| 4,582,307 A | 4/1986 | Wang |
| 4,912,949 A | 4/1990 | Bowers |
| 5,249,888 A | 10/1993 | Braithwaite |
| RE35,937 E | 10/1998 | DiStasio |
| 5,951,224 A | 9/1999 | DiStasio |
| 6,010,289 A | 1/2000 | DiStasio et al. |
| 6,089,556 A | 7/2000 | Whiteford |
| 6,102,639 A | 8/2000 | DiStasio |
| 6,250,621 B1 | 6/2001 | Ping |
| 6,264,411 B1 | 7/2001 | DiStasio |
| 6,679,663 B1 | 1/2004 | DiStasio |
| 6,905,297 B1 | 6/2005 | DiStasio et al. |

OTHER PUBLICATIONS

*Insulated Jumpers*, pp. 6-2/6-4, W.H. Salisbury & Co. (1991).

* cited by examiner

*Primary Examiner*—Javaid H. Nasri
(74) *Attorney, Agent, or Firm*—McDermott Will & Emery LLP

(57) ABSTRACT

A locking clamp assembly that permits movement in one direction and prevents movement in a second direction to eliminate unintentional locking clamp assembly loosening encountered during normal operation. The locking clamp assembly includes a clamp head with a threaded portion and at least one retaining slot traversing the threaded portion, a clamp housing adapted to threadedly received the clamp head, and a locking pin that is operatively mounted on the clamp housing and is positioned adjacent to the retaining slot. When the locking clamp assembly is engaged, the locking pin is adapted to interact with at least one retaining slot to prevent the locking clamp assembly from movement in a first direction and for actuation by a retaining slot to enable movement of the locking clamp assembly in a second direction. There is also an engage means for the locking pin to selectively engaged or disengaged the locking clamp assembly.

30 Claims, 7 Drawing Sheets

LOCKING CLAMP ASSEMBLY

TECHNICAL FIELD

The present invention relates generally to clamp locking mechanisms, and particularly to jumper clamp locking mechanisms used in electric current carrying apparatus for attaching a jumper cable to an overhead conductor.

BACKGROUND

Jumper clamps and jumper locking clamps for securing current carrying jumper cables to conductors are well known. Existing jumper locking clamps typically comprise a tubular housing having a threaded portion into which a threaded jumper head is screwed. The tubular housing may be a hollow cylindrical tube or body with an internal recessed area that securely accepts a threaded insert which defines a threaded orifice or aperture. The jumper head typically has an upper curved portion that conforms to the shape of a conductor and a lower threaded portion. The jumper head rests on the conductor while the threaded jumper head is threadedly received by the threaded portion of the tubular housing during installation. The threaded jumper head is electrically connected to a jumper cable or conductor.

During normal operation, existing jumper locking clamp designs typically encounter unintentional loosening of the locking clamp due to thermal cycling, mechanical vibration or other physical shocks on the conductor experienced during normal use. The loosening can result in a hazardous condition due to poor electrical connections between the loosened jumper locking clamp and the conductor.

Existing methods employed to mitigate these drawbacks include re-tightening or over-tightening the jumper locking clamp to prevent or minimize unintentional loosening. However, over-tightening can deform or damage the current carrying conductor, electrical insulation, or tubular housings. Also, over-tightening can cause the jumper locking clamp to stick or seize, requiring the use of special tools to assist in the subsequent removal of the jumper locking clamp which leads to increased removal time. Further, although over-tightening remedies unintentional loosening problems in the short term, unintentional loosening still occurs in the long term which results in hazardous or unsafe conditions, e.g., at installations or facilities that have long intervals between servicing and maintenance. Thus, re-tightening or over-tightening does not adequately address problems of unintentional loosening of existing jumper locking clamp designs, it only delays the onset of unintentional loosening of the jumper locking clamp.

There is thus a need for an improved jumper locking clamp design that prevents unintentional loosening of the jumper locking clamp due to vibration, thermal cycling or physical shock while still enabling easy installation and removal of the jumper locking clamp.

SUMMARY

The present invention provides a locking clamp assembly that, when engaged or locked, permits movement in one direction, e.g., in a tightening direction, and at the same time prevents movement in a second direction, e.g., in a loosening direction. The present invention provides a locking clamp assembly having a threaded member having a retaining slot traversing a threaded portion, a housing adapted to received the threaded member, and a locking pin mounted on the receiving housing. When the locking clamp assembly is engaged, the locking pin is adapted to cooperate with the retaining slot to permit the locking clamp assembly to move or rotate in a first direction, e.g., a tightening direction, while simultaneously preventing the locking clamp from moving in an opposing second direction, e.g., a loosening direction. Further, the locking assembly can include an engage means for selectively setting said locking clamp assembly in an engaged position. The locking clamp assembly eliminates and prevents unintentional loosening of the locking clamp assembly due to vibration, thermal cycling or physical shock encountered during normal operation of the locking clamp assembly.

One advantage of the present invention is a positive lock for a locking clamp assembly that prevents unintentionally loosening of the locking clamp assembly.

Another advantage of the present invention is to simultaneously permit tightening of the locking clamp assembly and prevent loosening of the clamp assembly.

Yet another advantage of the present invention is to provide a jumper locking clamp assembly that is easy to operate, install and remove.

A further advantage of the present invention is to provide a jumper locking clamp assembly that does not require new or additional tools for installation and removal.

An additional advantage of the present invention is to provide a jumper locking clamp assembly that provides a consistent and secure electrical connection or contact.

Additional advantages and novel features will be set forth in part in the description which follows, and in part will become apparent to those of ordinary skill in the art upon examination of the accompanying drawings or may be learned by production, operation or practice of the invention. The following drawings and description set forth additional advantages and benefits of the invention.

DESCRIPTION OF THE DRAWINGS

In the figures, like reference numerals refer to the same or similar elements. The description may be better understood when read in connection with the accompanying drawings, of which.

DETAILED DESCRIPTION

There is provided a locking clamp assembly that, when engaged or locked, permits movement in only one direction, such as a tightening direction, and prevents movement in a second direction, such as a loosening direction. The locking clamp assembly eliminates and prevents unintentional loosening of the locking clamp assembly due to vibrations, thermal cycling or physical shock encountered during normal operation of the locking clamp assembly.

Figure 1A:
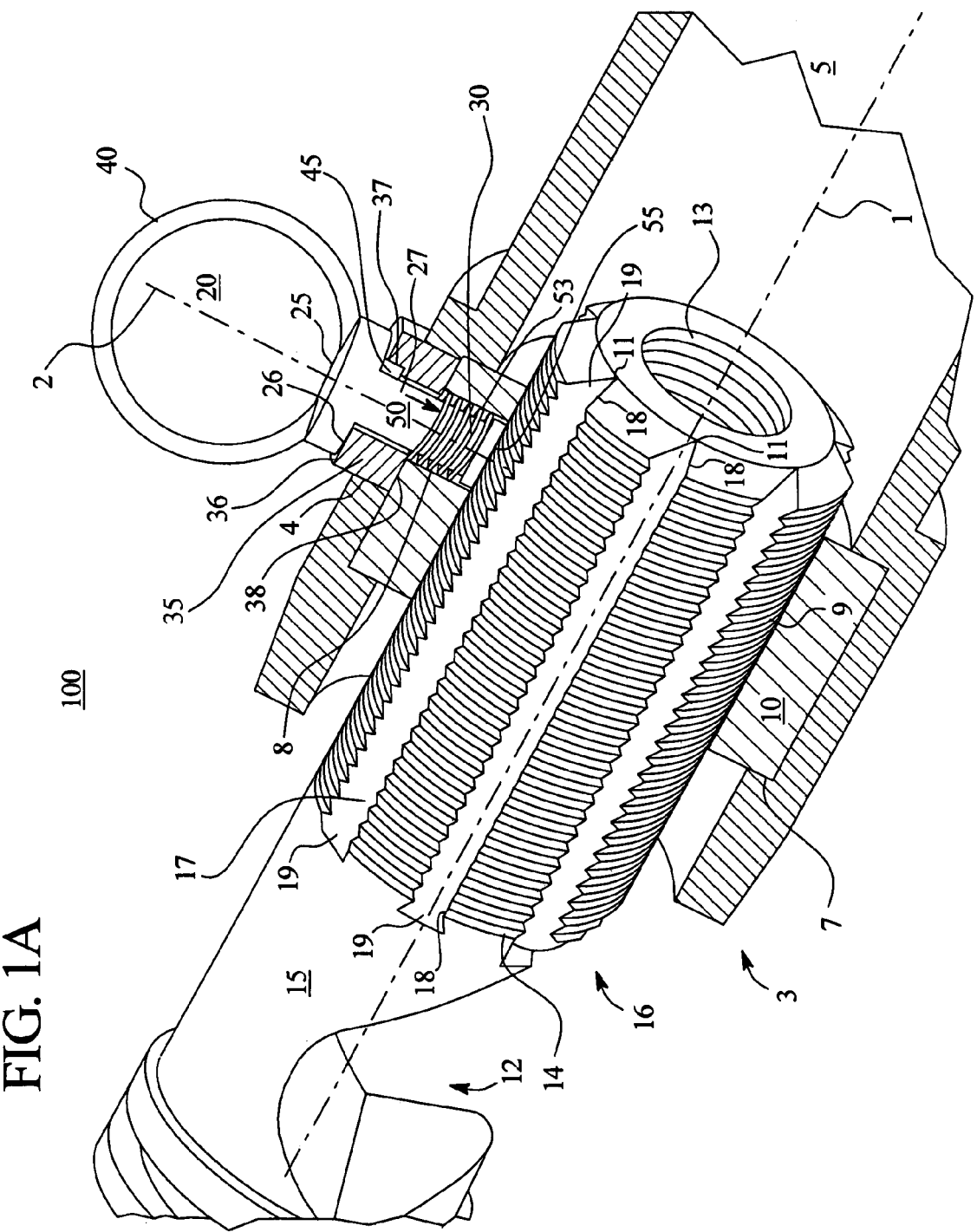
FIG. 1A illustrates a partial cut-away isometric view of a locking clamp assembly in an engaged position according to an embodiment of the present invention.
Figure 1B:
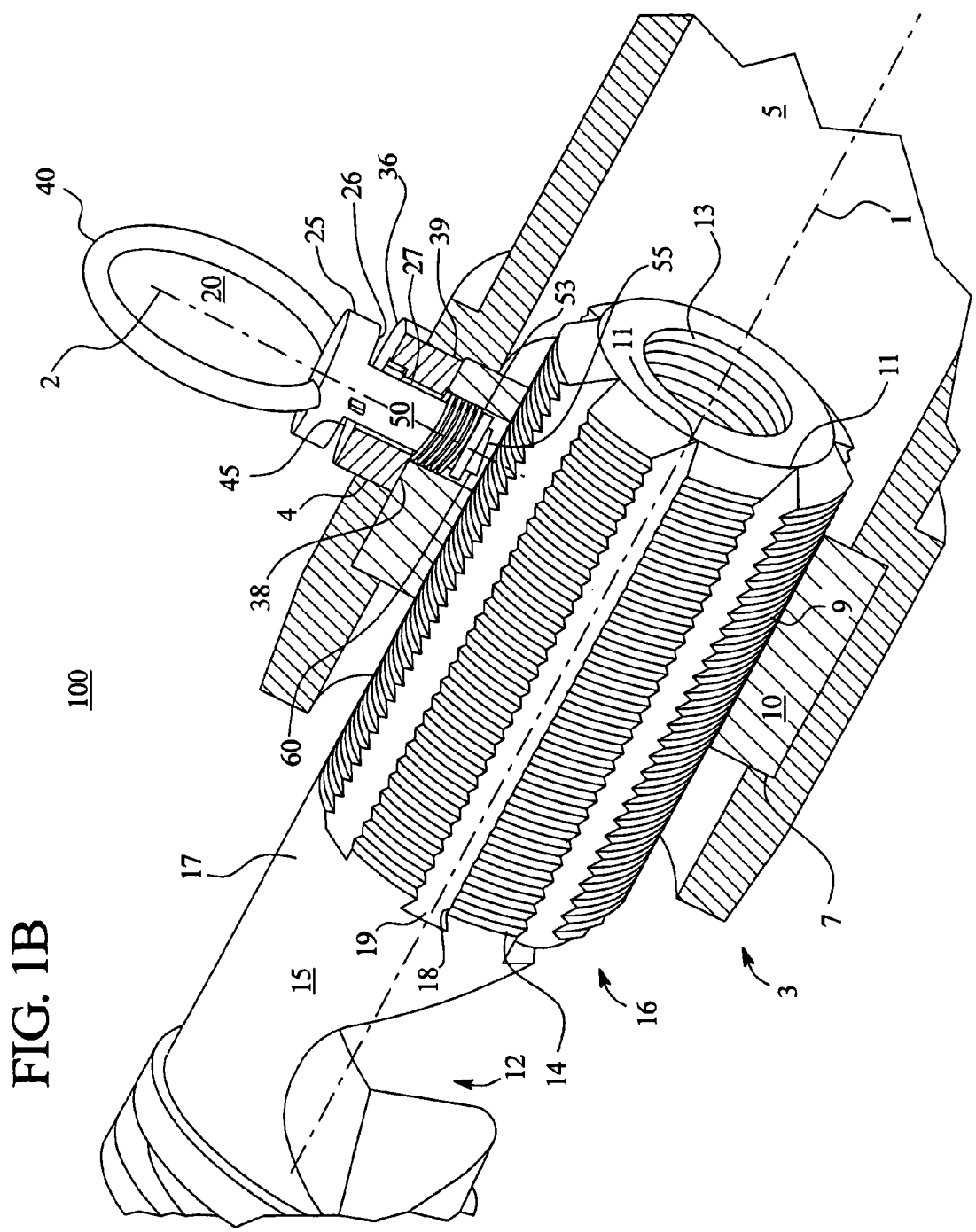
FIG. 1B illustrates the locking clamp assembly of FIG. 1A in a disengaged position.

FIG. 1A shows an isometric view of one embodiment of the locking clamp assembly 100 of the present invention in an engaged or locked position. FIG. 1B shows an isometric view of the locking clamp assembly 100 in a disengaged or unlocked position. The locking clamp assembly 100 includes a clamp body or housing 5 with a threaded insert 10 that preferably screws or threads onto a clamp head 15 having at least one retaining slot 17, and a spring loaded locking mechanism 20 mounted on the clamp housing 5. The clamp head 15 together with the clamp housing 5 and locking mechanism 20 cooperate to securely attach the locking clamp assembly 100 to an electrical conductor or bus bar.

The clamp head 15 is preferably is made up of conductive material and comprises an upper portion 12 and a lower portion 16. In the embodiment shown in FIGS. 1A and 1B, the upper clamp head portion 12 is a curved cutout substantially in the form of a hook. Those of ordinary skill in the art will readily recognize that the shape and configuration of the upper portion 12 can be different so long as the upper portion 12 and complimentary clamp housing end 5 can be secured and attached to an electrical conductor or bus bar. The upper clamp head portion 12 and clamp housing end 3 cooperatively secure and tighten the locking clamp assembly 100 to a conductor or bus bar when the clamp housing 5 is screwed upward onto the lower clamp head section 16 when the clamp housing 5 is rotated in a tightening direction. For example, in the illustrations shown in FIGS. 1A and 1B, a standard clockwise rotation may be used for tightening the clamp housing 5 onto the jumper clamp housing 5. Those of ordinary skill in the art will readily recognize that other known conventions and methods may be used to tighten the locking clamp assembly 100, e.g., using a counterclockwise direction.

The lower clamp head portion 16 preferably includes exterior threads 14 that engage the clamp housing 5, via the threaded insert 10, to enable the jumper clamp housing 5 to travel along a longitudinal clamp head reference axis 1. The traveling action occurs by rotating the clamp housing 5 about the lower clamp head portion 16 in either a tightening direction or a loosening direction. The lower clamp head portion 16 also defines a threaded bore 13 that extends along the longitudinal clamp head reference axis 1. The threaded bore 13 threadedly engages a second electrical conductor or jumper cable to thereby provide an electrical connection between a first electrical conductor to which the locking clamp assembly 100 is being attached and a second electrical conductor or jumper cable.

Figure 2:
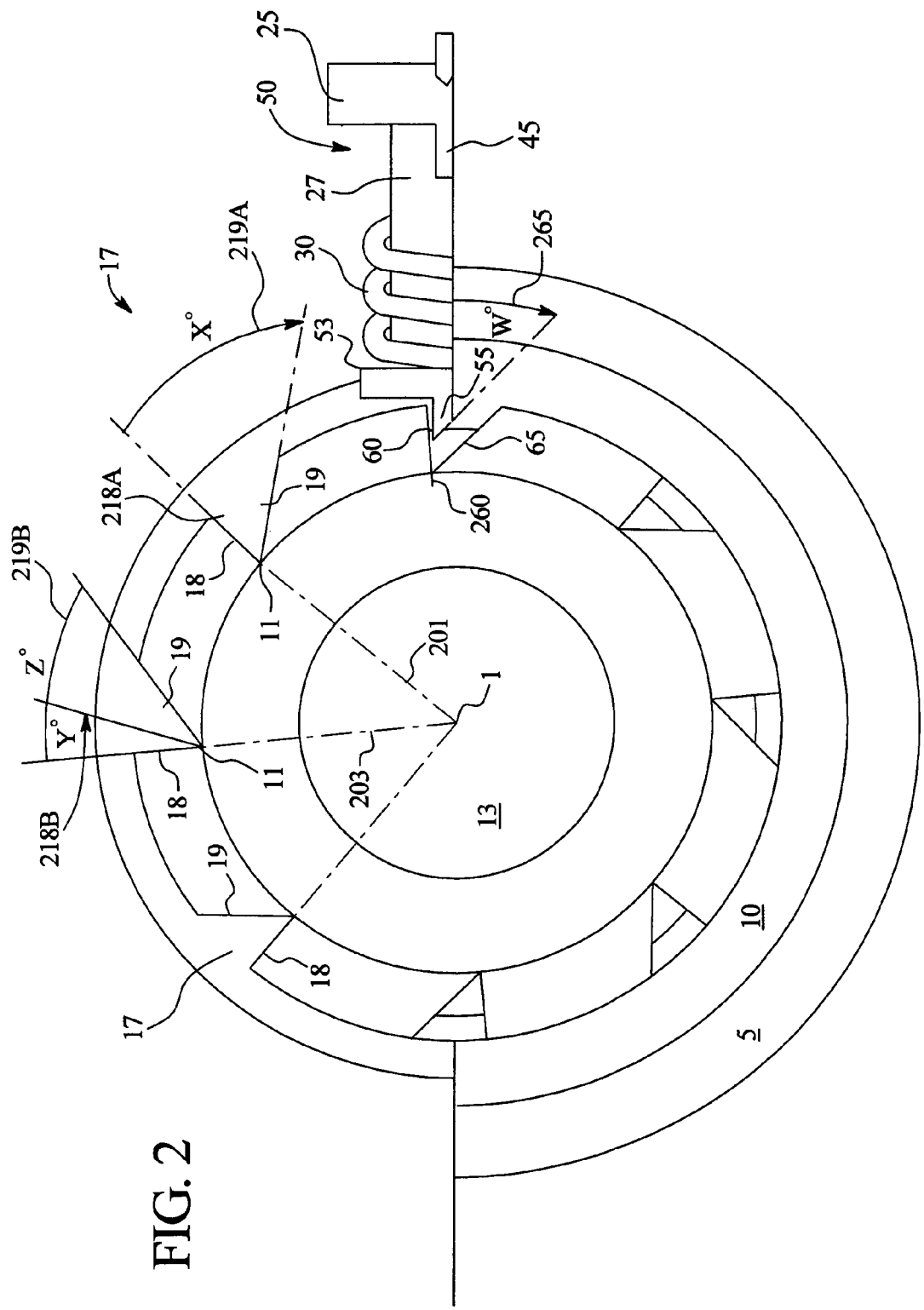
FIG. 2 illustrates a partial cut-away end view of the locking clamp assembly of FIG. 1A in an engaged position.

The lower clamp head portion 16 comprises at least one retaining slot or groove 17 that, in conjunction with a locking mechanism 20, discussed below, serves to prevent movement of the locking clamp assembly 100 in a loosening direction when the locking mechanism 20 is in an engaged or locked position, as shown in FIGS. 1A and 2. FIGS. 1A, 1B and 2, show a clamp head 15 with a plurality of retaining slots 17. Each retaining slot 17 is preferably cut transversely across the clamp head threads 14 and substantially extends lengthwise along the lower clamp head portion 16 in an orientation that is substantially parallel to the longitudinal clamp head axis 1, as shown in FIGS. 1A and 1B. Further, in a clamp head 15 with more than one retaining slot 17, the retaining slots 17 are preferably uniformly spaced around the exterior threads 14 of the lower clamp head 16 at equal intervals. However, those of ordinary skill in the art will readily recognize that uneven spacing of the retaining slots 17 may also be employed.

As shown in FIGS. 1A, 1B and 2, the retaining slots 17 preferably comprise a first slot face or wall 18 and an opposing second slot face or wall 19 that is preferably inclined relative to the first slot wall 17. Further, the first slot wall 18 and the opposing second slot wall 19 are oriented such that they intersect at a slot vertex point 11, shown in FIGS. 1A, 1B and 2. The first and second slot walls 18 and 19 are preferably inclined with respect to radial slot reference lines such as 201 and 203, shown in FIG. 2, defined between the clamp head longitudinal axis 1 and slot vertex point 11. The inclination of the first and second slot walls 18 and 19 relative to the radial slot reference line 201 can vary so long as the resulting retaining slot 17 prevents movement of the locking clamp assembly 100 in a loosening direction while permitting movement of the clamp housing 5 in a tightening direction from an engaged position.

FIG. 2 illustrates, a first case were the angle of inclination 218A of the first slot wall 18 is oriented at zero degrees (0°) relative to a radial slot reference line 201, and where the angle of inclination 219A of the second slot wall 19 is oriented or inclined at X degrees (X°) relative to the radial slot reference line 201. FIG. 2, also illustrates a second case where the angle of inclination 218B of the first slot wall 18 is oriented at Y degrees (Y°) relative to a radial slot reference line 203, and where the angle of inclination 219B of the second slot wall 19 is oriented or inclined at Z degrees (Z°) relative to the radial slot reference line 203. In one embodiment, the angle of inclination 218A of the first slot wall 18 is zero degrees (0°) relative to a radial slot reference line 203, and the angle of inclination 219A of the second slot wall 19 is sixty degrees (60°) relative to the radial slot reference line 203. Further, the angle of inclination 218A and 218B of the first slot wall 18 may be in a range of about plus or minus fifteen degrees (±15°) relative to a corresponding radial slot reference line 201 and 203. Also, the angle of inclination 219A and 219B of the second slot wall 19 may be in a range of about forty-five to sixty degrees (45–60°) relative to a corresponding radial slot reference line 201 and 203. In one preferred embodiment, the first slot wall 18 and the second slot wall 19 further define an angle of sixty degrees (60°) relative to each other, where the first slot wall is aligned with radial slot reference line 201 and 203. Additionally, those of ordinary skill in the art will readily recognize that the orientation of the first slot wall 18 and second slot wall 19 for each of the various retaining slots 17 may be the same or different so long as the resulting retaining slot 17 prevents movement of the locking clamp assembly 100 in a loosening direction while permitting movement of the clamp housing 5 in a tightening direction from the engaged position.

In the embodiment shown in FIG. 1A, the clamp housing 5 is a tubular or cylindrical housing having an interior lengthwise cylindrical cavity with a threaded housing insert 10 positioned adjacent to an open clamp housing end 3. The clamp housing is preferably constructed of a non-conductive material, such as plastic or ceramic, while the threaded housing insert is made up of an electric current conductive material, e.g., a conductive metal. In a preferred embodiment, the clamp housing 5 screws onto the clamp head 15 to secure the locking clamp assembly 100 to an electrical conductor in an operational position.

Figure 1C:
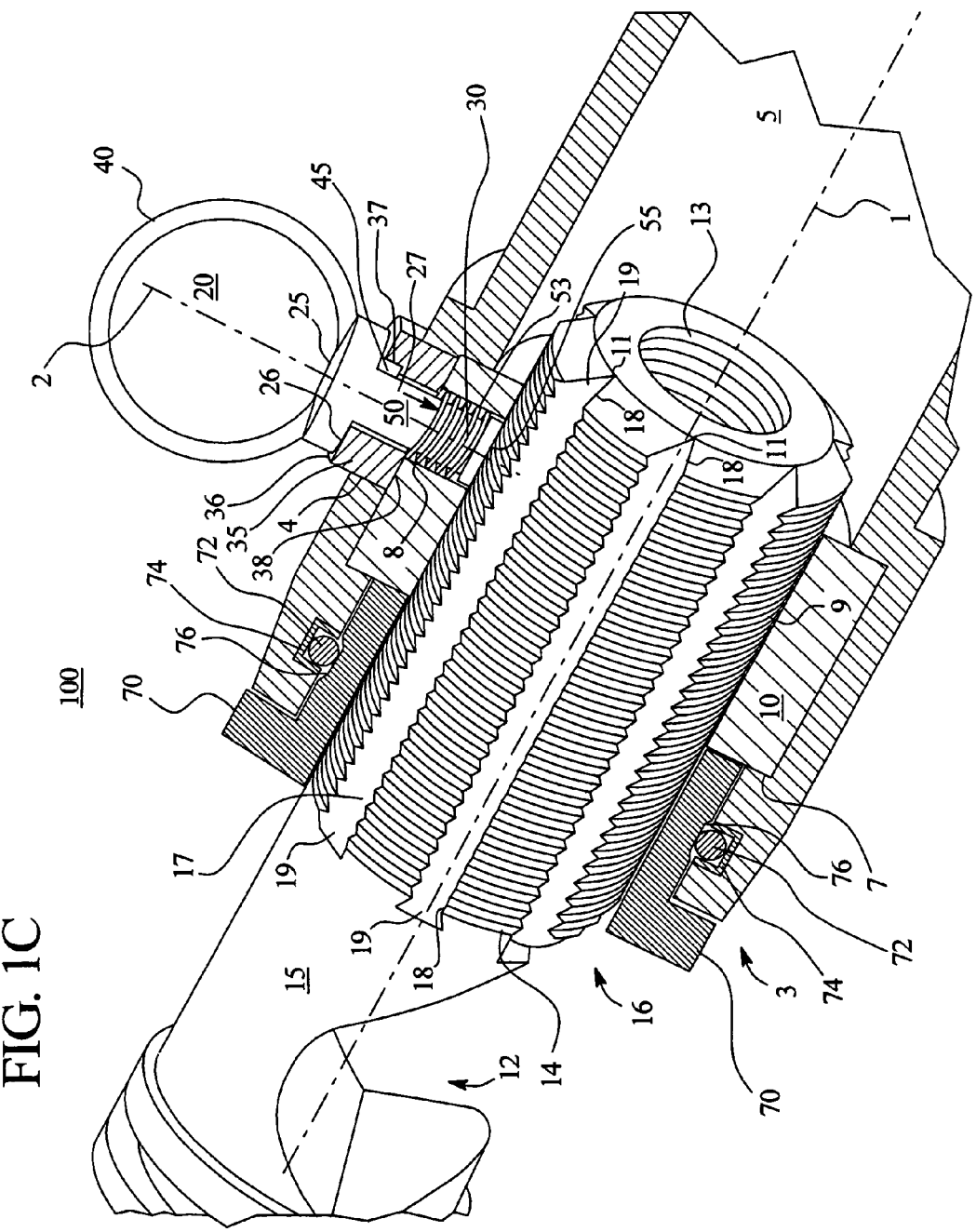
FIG. 1C illustrates a partial cut-away isometric view of a locking clamp assembly in an engaged position according to an alternate embodiment of the present invention.

FIG. 1C shows that the clamp housing 5 may include a conductor support 70 positioned at the top end 3 of the clamp housing 5 adjacent the threaded housing insert 10 and secured to the clamp housing 5 via a retaining ring 72 positioned in a top housing ring recess section 74. The retaining ring 72 secures the conductor support 70 to the top end 3 of the clamp housing 5 via interaction with the top housing recess section 74 and an opposing conductor support ring recess 76. The conductor support 70 is an electric current pathway and is preferably a conductive metal or material that can transmit current from a conductor attached to the locking clamp assembly 100 to threaded housing insert 10.

FIGS. 1A and 1B show that the clamp housing 5 also comprises an interior recessed section 7 that extends circumferentially along the interior of the tubular housing 5 to securely accept a threaded housing insert 10. The clamp housing 5 comprises a retaining insert bore or orifice 4 adjacent to the interior recessed section 7 and extending from the exterior of the clamp housing 5 to the interior recessed section 7. The retaining insert bore 4 is adapted to accept a retaining insert 35 of the locking mechanism 20, discussed below.

The threaded housing insert 10 is generally a cylindrical or annular configuration that is securely positioned into the interior recessed section 7 and defines a threaded interior orifice or aperture 9 that will cooperate with corresponding exterior threads 14 on a lower clamp head section 16 to enable the clamp housing 5 to be mounted and tightened onto the clamp head 15. In a preferred embodiment, the threaded housing insert 10 is operatively positioned in the interior recessed section 7 through a molding process. The threaded clamp housing insert 10 is preferably comprised of a conductive material such as molded brass, however other conductive metals or materials, e.g., stainless steel, may also be used. Further, the threaded housing insert 10 comprises a first pin shaft bore 8 extending through the threaded housing insert 10 and adjacent to and aligned with the retaining insert bore 4. The first pin shaft bore 8 is adapted to accept a pin shaft 50 and pin guide 53 of the locking mechanism, discussed below.

FIGS. 1A, 1B and 2, also show a spring-loaded locking mechanism 20 operatively positioned on the clamp housing 5 adjacent the clamp housing end 3. In this embodiment, the spring-loaded locking mechanism 20 comprises a retaining insert 35, a locking pin 50, a biasing spring 30 and a pin engage tab 45 that engages and disengages the locking mechanism 20. In an engaged or locked position, the locking mechanism 20 permits rotation of the clamp housing 5 only in a tightening direction, which in the embodiment shown in FIGS. 1A, 1B and 2, is a clockwise direction, and prevents rotation of the clamp housing 5 in a loosening or reverse direction. In the disengaged position, the locking mechanism 20 permits unobstructed movement of the clamp housing 5 in both a tightening and loosening direction.

The retaining insert 35 has an annular configuration with a second pin shaft bore 38 extending through the retaining insert 35. As best shown in FIGS. 1A and 1B, the retaining insert 35 is preferably positioned in the retaining insert bore 4 of the clamp housing 5 adjacent to the first pin shaft bore 8 of the threaded housing insert 10. The retaining insert 35 and threaded housing insert 10 are preferably positioned such that the first and second pin shaft bores 8 and 38 are centered about a locking pin centerline 2. The first pin shaft bore 8 is adapted to accept a pin shaft 50 and pin guide 53 of the locking mechanism. The second pin shaft bore 38 is sized to accept the pin shaft 27 and to permit the pin shaft 27 to move back and forth within the second pin shaft bore 38.

The retaining insert 35 further comprises a pin engage slot 37 partially extending into an exterior surface 36 of the retaining insert 35. The pin engage slot 37 is preferably sized and configured to accept the pin engage tab 45 extending from an opposing bottom surface 26 of the pin head 25 and serves to maintain the engage tab 45 in a fixed position so that the pin 50 is rotationally fixed. Those of ordinary skill in the art will readily recognize that other configurations for the combination of the pin engage slot 37 and pin engage tab 45 can be used. For example, the pin engage slot 37 could instead be a pin engage projection, and the complimentary mechanism engage tab 45 would then be configured as a mechanism engage bore that would accept the pin engage projection.

In the embodiment shown in FIGS. 1A, 1B and 2, the locking pin 50 comprises a pin head 25, a pin shaft 27 with biasing spring 30, a pin guide 53 with an extending pin tab 55 having a retaining first pin face 60 and a inclined second pin face 65. The locking pin 50 is preferably oriented or positioned in such a manner that the longitudinal axis 1 of the clamp head 15 and a locking pin centerline 2 are in the same geometric plane and perpendicular to each other. Those of ordinary skill in the art will readily recognize that the longitudinal axis 1 of the clamp head 15 and the locking pin centerline 2 may also have other orientations where they are in the same plane but not perpendicular to each other, or not in the same plane.

The pin head 25 is located at one external end of the pin shaft 27 and the pin guide 53 is located at the opposing end of the pin shaft 27. The pin head 25 and pin guide 53 are preferably orientated perpendicularly to the locking pin centerline 2. The pin head 25 is adjacent to the exterior surface of the retaining insert 35. The pin head 25 comprises an engage tab 45 that protrudes or extends away from the bottom surface 26 towards the retaining insert 35 and cooperates with the pin engage slot 37 to maintain the locking mechanism 20 in an engaged or locked position and thereby prevents rotation of the locking mechanism. The locking pin 50 may also include a pin grip or pin ring handle 40 attached to the pin head 25 to facilitate the retraction and rotational movement of the locking pin 50 to thereby engage or disengage the locking mechanism 20. Those of ordinary skill in the art will readily recognize that the locking pin grip 40 may have other configurations which enable engagement and disengagement of the locking mechanism 20. Further, the locking mechanism 20 may use a locking pin 50 without a pin ring handle 40. In such an instance, the locking mechanism 20 can instead be actuated via the pin head 25, which may be constructed of materials the permit the pin head 25 to be easily and securely gripped and turned, e.g., rubber or plastic materials over a metal base or gripping grooves in a metal base, etc.

The pin shaft 27 operatively extends into and through the first pin shaft bore 8 of the clamp body insert 10 and the second pin shaft bore 38 of the mechanism retaining insert 35. The pin shaft 27 is adapted to slideably move inside the second pin shaft bore 38. The size of the second pin shaft bore 38 preferably matches the pin shaft 27 to permit the pin shaft 27 to slideably move back and forth within the second pin shaft bore 38. The pin shaft 27 also travels inside the first pin shaft bore 8 via the pin guide 53. The size of the pin guide 53 is sized to compliment the pin shaft bore 8 to thereby permit the pin shaft 27, via the pin guide 53, to move back and forth within the first pin shaft bore 8.

The pin guide 53 includes an extending pin tab 55 having a retaining first pin face 60 and an inclined second pin face 65 that are inclined relative to each other. As shown in FIG. 2, the first retaining pin face 60 and the actuating second pin face 65 have an orientation that can be measured with respect to the locking pin center line 2. FIG. 2 shows an embodiment where the angle of inclination 260 of the retaining first pin face 60 is oriented at zero degrees (0°) relative to the locking pin center line 2, and where the angle of inclination 265 of the second pin face 65 is oriented or inclined at W degrees (W°) relative to the locking pin center line 2. In a preferred embodiment, the angle of inclination 260 of the first pin face 60 is zero degrees (0°) relative to the locking pin center line 2, and the angle of inclination 265 of the second pin face 65 is forty-five degrees (45°) relative to the locking pin center line 2. Further, the angle of inclination 260 of the first pin face 60 may take on an orientation in a range of about plus five degrees (+5°) to about minus thirty degrees (−30°) relative to the locking pin center line 2. The angle of inclination 265 of the second pin face 65 may be in a range of about thirty to sixty degrees (30–60°) relative to the locking pin center line 2.

The extending pin tab 55, via the first retaining pin face 60 and second inclined pin face 65, in cooperation with a retaining slot 17 prevent movement of the locking clamp assembly 100 in one direction when the locking mechanism 20 is in the engaged or locked position, as shown in FIGS. 1A and 2, and permits continuous movement of the locking clamp assembly 100 in an opposite direction whether the locking mechanism 20 is engaged or disengaged. Those of ordinary skill in the art will readily recognize that the orientation of the first and second pin faces 60 and 65 may have other orientation values and ranges relative to the locking pin center line 2 so long as the extending pin tab 55 in cooperation with the retaining slot 17 simultaneously prevents movement of the clamp housing 5 in a loosening direction when the locking mechanism 20 is engaged, and permits movement of the clamp housing 5 in a tightening direction from the engaged position.

The orientation of the first pin face 60 and second pin face 65 enable proper operation and interaction with the first and second slot walls 18 and 19 of the retaining slot 17 to enable proper operation of the locking clamp assembly 100. The first pin face 60 and opposing first slot wall 18, shown in FIGS. 1B and 2, cooperate to prevent actuation of the locking mechanism 20 from the engaged position to the disengaged position. The inclined first pin face 60 and the opposing inclined first slot wall 18 prevent the clamp housing 5 from rotating in a loosening direction when the locking mechanism 20 is engaged. The inclined second pin face 65 in conjunction with the opposing inclined second slot wall 19 permit the clamp housing 5 to rotate in a tightening direction whether the locking mechanism 20 is engaged or disengaged. When the locking mechanism 20 is in the engaged position, the second pin face 65 and the opposing second slot wall 19, shown in FIGS. 1B and 2, cooperate to facilitate actuation of the locking mechanism 20 from the engaged position to a disengaged position.

The first pin face 60 and the first slot wall 18 preferably have complimentary orientations such that they cooperate to prevent movement of the first pin face 60, and thereby prevent movement of the clamp housing 5 in a loosening direction when the locking mechanism is in the engaged position. The incline second pin face 65 and the inclined second slot wall 19 preferably have complimentary orientations such that they cooperate to permit movement of the clamp housing 5 in a tightening direction whether the locking mechanism 20 is in an engaged or disengaged position.

Referring to FIGS. 1A, 1B and 2, the locking pin 50 also includes an actuation or biasing spring 30 operatively positioned on the pin shaft 27 between the pin guide 53 and an interior surface 39 of the retaining insert 35. The retaining insert 35 is in a fixed position in the locking mechanism 20 and therefore, the biasing spring 30 imparts a force on the moveable locking pin 50 via the pin guide 53. The spring 30 provides a moving force that normally tends to force the locking pin 50 toward the retaining slot 17 or the threads 14 of the clamp head 15. When the biasing spring 30 is fully extended, the locking mechanism 20 is in an engaged position or locked position. Conversely, the locking mechanism 20 is disengaged or unlocked when the biasing spring 30 is contracted.

When the locking mechanism 20 is in the engaged or locked position, shown in FIGS. 1A and 2, the engage tab 45 is inserted or positioned in the pin engage slot 37 resulting in pin tab 55 extending into a retaining slot 17. The locking mechanism 20 is held in the engaged position via the pin engage slot 37 and the biasing spring 30 that provides a spring force tending to bias or push the pin 50 into or towards the retaining slots 17 on the clamp head 15. In a preferred aspect, the biasing spring 30 is comprised of a stainless steel material, though other materials that provide the required biasing and have non-corrosive properties may also be used. In the engaged position, the locking mechanism 20 prevents movement or rotation of the clamp housing 5 in a loosening direction. Also, in this position, the locking mechanism 20 permits rotation of the clamp housing 5 only in a tightening direction.

To disengage or unlock the locking mechanism 20 for loosening purposes, the locking pin 50, via the pin head 25 or pin grip 40, is actuated or pulled in an outward direction to overcome the force provided by the biasing spring 30. This action retracts or pulls the engage tab 45 out of the pin engage slot 37 in the retaining insert 35. The locking pin 50 is then rotated such that the engage tab 45 is no longer aligned with the pin engage slot 37 and thereby will not re-enter the pin engage slot 37 when the locking pin 50 is released. In one embodiment, the locking pin 50 can be rotated a minimum of 10 degrees (10°) in either a clockwise or counter clockwise direction. When the locking pin 50 is released, the engage tab 45 lands on the exterior surface 36 of the retaining insert 35 and the biasing spring 30 remains compressed and unable to return or move the locking pin 50 into the retaining slot 17 since the engage tab 45 does not re-enter the pin engage slot 37. In this position, the locking mechanism 20 is in the disengaged or unlocked position. In the disengaged position, the locking mechanism 20 does not obstruct movement of the clamp housing 5 and permits unimpeded movement or rotation of the clamp housing 5 in both the loosening and tightening directions.

To re-engage the locking mechanism 20, the locking pin 50, via the pin head 25 or pin grip 40, is rotated until the engage tab 45 is again aligned with the pin engage slot 37 where it snaps back into or reenters the pin engage slot 37. The locking pin engage tab 45 is pulled back into the pin engage slot 37 by the biasing spring 30 which is now able to extend and thereby provide the force necessary to move the locking pin 50 into the retaining slot 17 and set the locking mechanism 20 back to the engaged position.

When the locking mechanism 20 is in the engaged position, the retaining slot 17 and the locking pin 50, via the pin guide 53 and extending pin tab 55, prevent rotation of the clamp housing 5 in the loosening direction. In the engaged position, the extending pin tab 55 is operationally located in the retaining slot 17. The first retaining slot wall 18 in cooperation with the retaining first pin face 60 prevent rotation of the clamp housing 5 past the first slot wall 18 which thereby maintains the locking clamp assembly 100 in the engaged position. In particular, the first retaining slot wall 18 creates a physical obstruction that prevents movement of the first pin face 60 if the clamp housing 5 is moved in the loosening direction. If the clamp housing 5 is rotated in the loosening direction while the locking mechanism 20 is engaged, the first pin face 60 travels in the retaining slot 17 until it comes into contact with the first slot wall 18. Upon contact of the opposing first pin face 60 and first slot wall 18, the first slot wall 18 obstructs the first pin face 60 and physically prevents further movement of the first pin face 60 thereby preventing the clamp housing 5 from further movement in the loosening direction. This maintains the locking mechanism 20 in the engaged position and the locking clamp assembly 100 tightly and securely installed.

Additionally, from the engaged position, the retaining slot 17 and the locking pin 50, via the pin guide 53 and extending pin tab 55, enable rotation of the clamp housing 5 in the tightening direction. The inclined second slot wall 19 in cooperation with the inclined second pin face 65 permit rotation of the clamp housing 5 past the retaining slot 17 to thereby enable the locking clamp assembly 100 to be set to a new and tighter position. Tightening the locking clamp assembly 100 involves rotation of the clamp housing 5 in the tightening direction, e.g., in a clockwise direction. This action moves the locking pin 50 inside the retaining slot 17 until the second pin face 65 encounters the adjacent and opposing second slot wall 19 of the clamp head 15.

Upon contact of the opposing second slot wall 19 and second pin face 65, and the continuing rotation of the clamp housing 5, the inclined nature of the second slot wall 19 enables the second pin face 65 to travel on the surface of the second slot wall 19. As the second pin face 65 travels or rides upwards along the second slot wall 19, a force is imparted from the second slot wall 19 to the inclined second pin face 65 to overcome the force of the biasing spring 30 and thereby pushes or actuates the spring-loaded locking pin 50 such that the locking mechanism 20 temporarily moves from the engaged position to the disengaged position. This enables the clamp housing 5 to continue to rotate in the tightening direction. Once the second pin face 65 reaches the top of the second slot wall 19, the locking pin 50 then travels or rides on the exterior threads 14 of the clamp head 15 as the clamp housing 5 continues to rotate in the tightening direction. When the locking pin 50 reaches the next or adjacent retaining slot 17, the biasing spring 30 provides a returning force such that the pin 50 will snap back into the retaining slot 17 to set the locking mechanism 20 to the engaged or locked position. Repeating this process, the clamp housing 5 can be rotated until the desired tightness of the clamp locking assembly 100 is achieved and the locking pin 50 resides in a retaining slot 17.

If the clamp housing 5 is left in the disengaged position and not rotated to the next retaining slot 17, the locking mechanism 20 remains in the disengaged position. Over time, the locking clamp assembly 100 may move or rotate in a loosening direction as a result of vibration, thermal cycling and/or physical shock encountered during normal operation of a device using the locking clamp assembly 100. In such a case, the locking clamp assembly 100 may move in a loosening direction and, if this movement continues, return to the previous retaining slot 17 where the locking pin 50 will again snap back into the retaining slot 17 returning the locking mechanism 20 back to an engaged or locked position.

Figure 3:
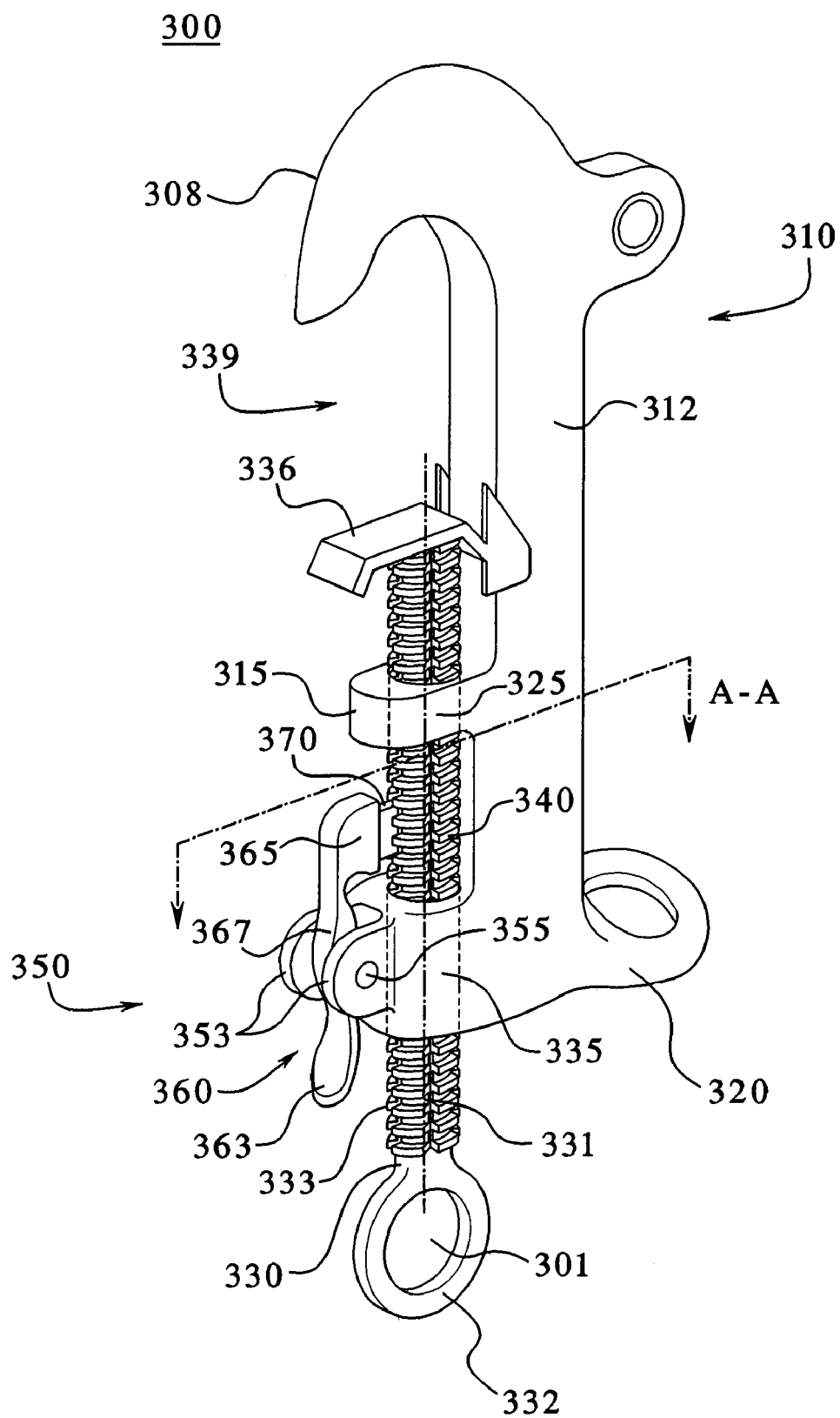
FIG. 3 illustrates an isometric view of a locking clamp assembly in an engaged position according to an alternate embodiment of the present invention.
Figure 4A:
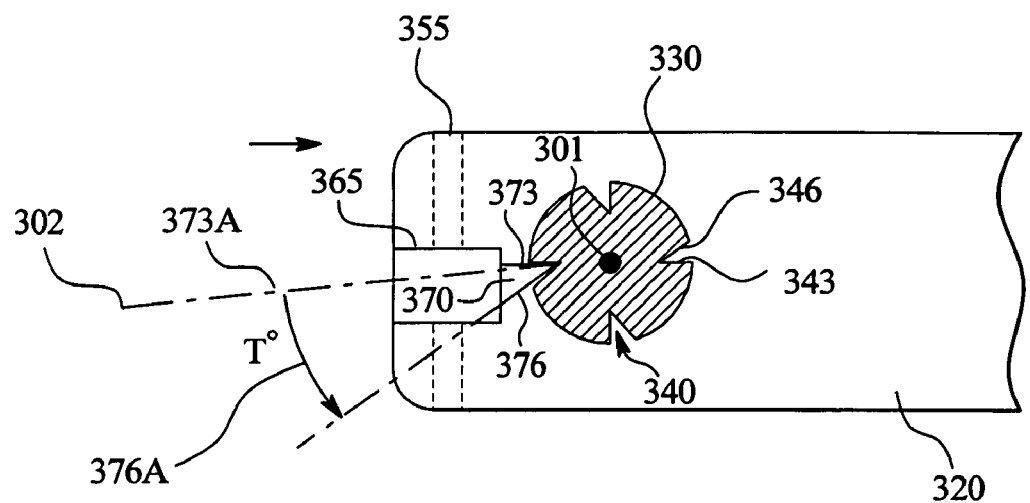
FIG. 4A illustrates a view along the line A—A of the locking clamp assembly of FIG. 3 in an engaged position.
Figure 4B:
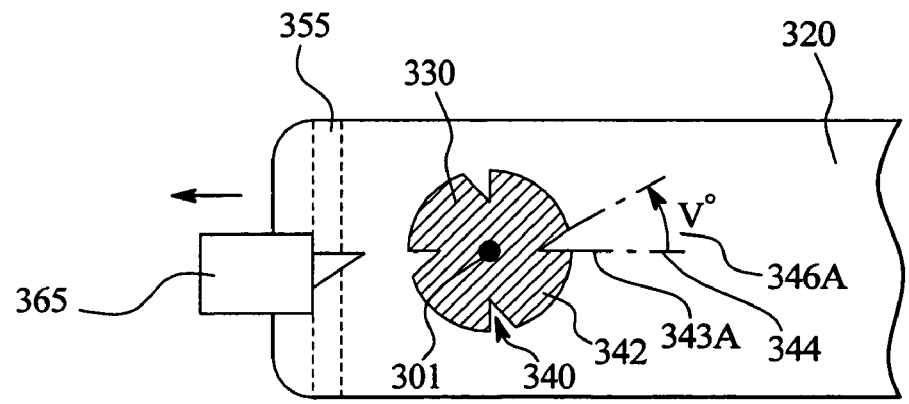
FIG. 4B illustrates a view along the line A—A of the locking clamp assembly of FIG. 3 in a disengaged position.

FIG. 3 illustrates an isometric view of a locking clamp assembly 300 in an engaged or locked position according to another embodiment of the present invention as applied to a C-clamp. FIGS. 4A and 4B are section views along the line A—A of the locking clamp assembly 300 in an engaged position and a disengaged position, respectively. The locking clamp assembly 300 comprises a clamp body 310 having a clamp base 320, a screw guide section 315, a holding screw 330, and a spring loaded locking mechanism 350. The spring loaded locking mechanism 350 in cooperation with the holding screw 330, the clamp body base 320 and screw guide section 315 simultaneously prevent the locking clamp assembly 300 from moving in a loosening direction when the locking mechanism 350 is in an engaged position and permits the holding screw 330 to be continuously moved in a tightening direction.

The holding screw 330 comprises a screw body 331, a holding screw head 332 and an object securing plate 336 on opposing ends of the holding screw 330. The holding screw 330 is generally an elongated cylindrical body 331 with a holding screw center or reference line 301. The holding screw also comprises external threading 333 that screws into the clamp base 320 and screw guide section 315. FIG. 3 shows that the holding screw head 332 can have a ring or eye screw head configuration. However, the holding screw head 332 may take on other configurations that permit the holding screw 330 to be rotated in a tightening or loosening direction. Similarly, the object securing plate 336, is shown as generally having flat surfaces, however, other shapes or configurations may be used to enable the holding screw 330 to grip an object in conjunction with the clamp head 308.

The holding screw 330 comprises at least one retaining slot or groove 340 that, in conjunction with a locking mechanism 350 (discussed below), serves to prevent movement of the locking clamp assembly 300 in a loosening direction when the locking mechanism 350 is in an engaged or locked position, shown in FIGS. 3 and 4A. FIGS. 3, 4A and 4B show a holding screw 330 with a plurality of retaining slots 340. Each retaining slot 340 is preferably cut transversely across the threads 333 and substantially extends lengthwise along the holding screw 330 in an orientation that is substantially parallel to the longitudinal holding screw center line 301, as shown in FIG. 3. Further, in this embodiment, the retaining slots 340 are all oriented substantially parallel to the longitudinal screw center line 301. The retaining slots 340 are spaced around the exterior threads 333 of the holding screw 330 at equal intervals. However, those of ordinary skill in the art will recognize that uneven spacing of the retaining slots 340 may also be employed.

In a manner similar to that described above for the embodiment of the locking clamp assembly shown in FIGS. 1A, 1B and 2, FIGS. 3–4B show that the retaining slots 340 preferably comprise a retaining first slot wall 343 and an opposing second slot wall 346 that is inclined relative to the first slot wall 343. Further, the first slot wall 343 and the opposing second slot wall 346 are oriented such that they intersect at a slot vertex point 342, shown in FIG. 4B. The first and second slot walls 343 and 346 are preferably inclined with respect to a radial slot reference line 344, shown in FIG. 4B, defined between the holding screw center line 301 and slot vertex point 342. The orientation of the first and second slot walls 343 and 346 relative to the radial slot reference line 344 can vary so long as the resulting retaining slot 340 simultaneously prevents movement of the holding screw in a loosening direction while permitting movement of the holding screw 330 in a tightening direction when the locking clamp assembly 300 is in an engaged position.

FIG. 4B illustrates, a case were the angle of inclination 343A of the first slot wall 343 is zero degrees (0°) relative to a radial slot reference line 344, and where the angle of inclination 346A of the second slot wall 346 is oriented or inclined at V degrees (V°) relative to the radial slot reference line 344. In one embodiment, the preferred angle of inclination 343A of the first slot wall 343 is zero degrees (0°) relative to the slot reference line 344, and the preferred angle of inclination 346A of the second slot wall 346 is sixty degrees (60°) relative to the radial slot reference line 344. Moreover, the angle of inclination 343A may be in a range of about plus or minus fifteen degrees (±15°) relative to a radial slot reference line 344. Also, the angle of inclination 346A of the second slot wall 346 may be in a range of about forty-five to sixty degrees (45–60°) relative to a radial slot reference line 344. Those of ordinary skill in the art will readily recognize that the orientation of the first slot wall 343 and second slot wall 346 for each of the various retaining slots 340 may be the same or different so long as the resulting retaining slot 340 simultaneously prevents movement of the locking clamp assembly 300 in a loosening direction while permitting movement of the holding screw 330 in a tightening direction from the engaged position.

In the embodiment shown in FIG. 3, the clamp body 310 generally defines a C-clamp configuration with a clamp head 308 connected to an extending clamp body section 312, and a clamp base 320 and screw guide section 315 extending from the extending clamp body section 312. The screw guide section 315 extends from a mid-portion of the extending body section 312 and is located between the clamp head 308 and clamp base 320. Those of ordinary skill in the art will readily recognize that other shapes or configurations may be used, and further that the extending body section 312 may have a straight, curved or other configuration.

The clamp base 320 includes a first threaded cylindrical holding screw cavity or aperture 335 extending through the clamp base 320. The screw guide section 315 includes a second threaded cylindrical holding screw cavity or aperture 325 extending through the screw guide section 315. The first and second threaded screw apertures 335 and 325 are centered and aligned with the holding screw center line 301 to permit the holding screw 330 to be screwed into the clamp base 320 and screw guide section 315. The first and second threaded screw apertures 335 and 325 cooperate with the exterior threads 333 of the holding screw 330 to enable the holding screw 330 to be inserted such that the an object to be held can be clamped or gripped between the holding screw head 332 and the clamp head 308.

The clamp base 320 also includes a pair of pivot flanges 353 extending exteriorly outward from an area adjacent to the first threaded screw aperture 335. The pivot flanges 353 are preferably positioned and aligned with each other so as to permit a spring loaded mechanism 350 to be attached through a pivot rod 355. The pivot flanges 353 can be flange-like members extending from the clamp base 308, or may be flange-like members attached to the clamp base 308, e.g., by welding.

FIGS. 3–5B illustrate a spring-loaded locking mechanism 350 operatively positioned on the pivot flanges 353 and pivot rod 355. In this embodiment, the locking mechanism 350 comprises a spring-biased pivoting handle 360 having a handle tab or wedge 370 and a V-spring 500. In the engaged or locked position, shown in FIGS. 3 and 4A, the locking mechanism 350 simultaneously permits rotation of the holding screw 330 only in a tightening direction and prevents rotation of the holding screw 330 in a loosening direction. In the disengaged position, shown in FIG. 4B, the locking mechanism 350 does not obstruct movement of the holding screw 330 and thus permits unimpeded rotation of the holding screw 330 in either a tightening or loosening direction.

The spring-biased handle 360 is generally an elongated body that comprises an upper handle end 365, a handle midsection 367 and a lower handle end 363. The spring-biased handle 360 is oriented along the longitudinal holding screw center line 301 such that the handle 360 is substantially oriented parallel to the holding screw 330. The upper handle end 365 is adapted to hold the handle tab 370 which cooperates with a retaining slot 340 on the holding screw 330 to set the locking mechanism 350 in an engaged position. The handle midsection 367 is adapted to position the spring-loaded handle 360 on the pivot rod 355 between the pivot flanges 353. The lower handle end 363 enables the locking mechanism 350 to be set in an engaged or disengaged position, as shown in FIGS. 4A and 4B, respectively. The handle midsection 367, pivot flanges and pivot rod enable the spring-loaded handle 360 to pivot about the pivot rod 355 when the lower handle end 363 is pressed. When the lower handle end 363 is pressed the upper handle end 365 swings away from the retaining slot 340 or holding screw 330. Conversely, when the lower handle end 363 is released the upper handle end 365 moves toward the retaining slot 340 or holding screw 330.

Figure 5A:
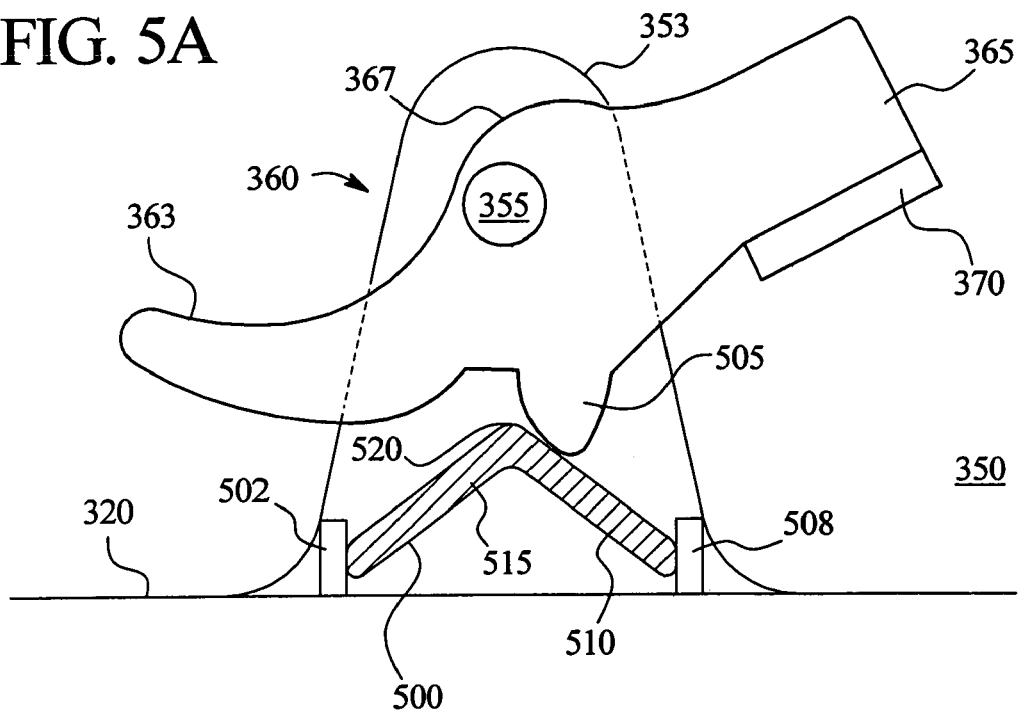
FIG. 5A illustrates a partial side view of a spring-loaded locking mechanism for the locking clamp assembly of FIG. 3 in a disengaged position.
Figure 5B:
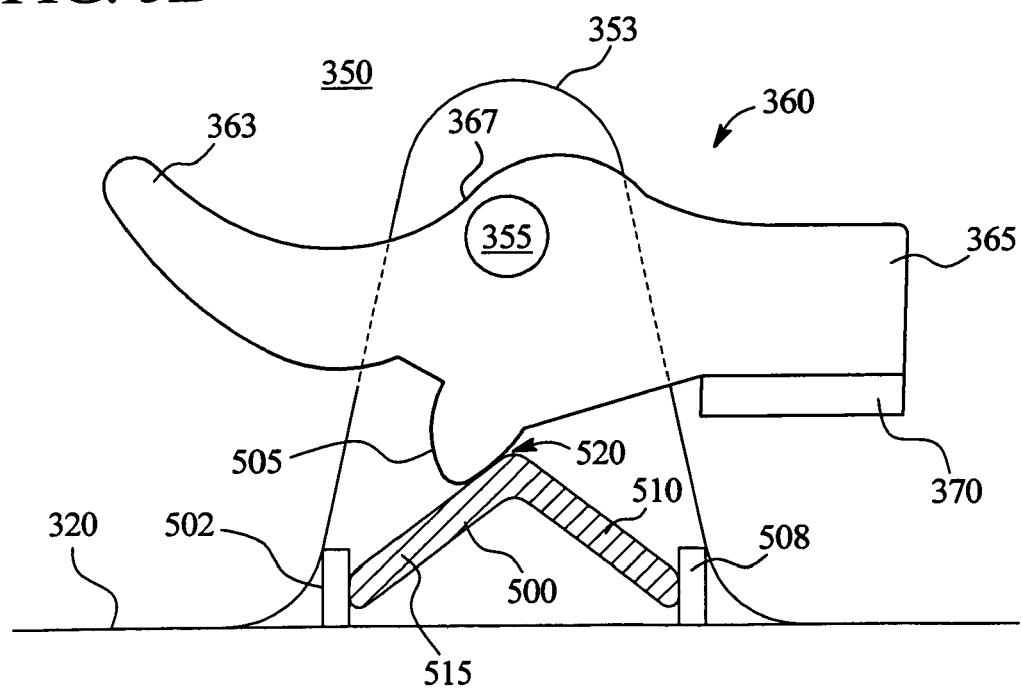
FIG. 5B illustrates a partial side view of a spring-loaded locking mechanism for the locking clamp assembly of FIG. 3 in an engaged position.

FIGS. 5A and 5B, illustrate one embodiment of the spring-biased pivoting handle 360 and an associated V-spring 500 that serves as the biasing means to maintain the spring-loaded locking mechanism 350 in a normally closed or engaged position, as shown in FIG. 4A. The V-spring 500 is preferably positioned between a bottom spring contact section 505 of the pivoting handle 360 and one or more spring securing members 502 and 508 attached to the clamp base 320. The V-spring 500 comprises an apex 520 and an upper and lower V-spring section 510 and 515 that interact with the bottom spring contact section 505 of the pivoting handle 360 to position the C-clamp 300 in an engaged position, as shown in FIG. 4A, or a disengaged position, as shown in FIG. 4B. The V-spring 500 is comprised of materials that permit the bottom spring contact section 505 to flex the V-spring when the pivoting handle 360 is actuated. Such materials can include metals, plastics or other materials with proper flexibility as needed to meet user applications. In the engaged position, i.e., the C-clamp locked position, the bottom spring contact section 505 is positioned to contact the upper V-spring section 510. In the disengaged position, i.e., the C-clamp open or unlocked position, the bottom spring contact section 505 is actuated and positioned to contact the lower V-spring section 515. The spring-loaded locking mechanism 350 is transitioned between its engaged and disengaged position by actuating the pivoting handle 360 at its lower handle end 363.

The handle tab or wedge 370 comprises a first tab face or wall 373 that is substantially vertical and a second tab face or wall 376 that is inclined relative to the first vertical tab face 373. As shown in FIGS. 3–4B, the handle tab 370 is operatively positioned on the upper handle end 365 adjacent to the holding screw 330. Similar to the extending pin tab 55 of the previous embodiment, the first tab face 373 and the second tab face 376 can have varying orientations relative to each other. As shown in FIGS. 4A and 4B, the first tab face 373 and the second tab face 376 have an orientation that can be measured with respect to an engage tab reference line 30 2. FIG. 4A shows a case were the angle of inclination 373A of the retaining or first tab face 373 is oriented at about zero degrees (0°) relative to the tab reference line 302, and where the angle of inclination 376A of the second tab face 376 is oriented or inclined at T degrees (T°) relative to the tab reference line 3022. In a preferred embodiment, the angle of inclination 373A of the first tab face 373 is zero degrees (0°) relative to the tab reference line 302, and the angle of inclination 376A of the second tab face 376 is forty-five degrees (45°) relative to the tab reference line 302. Moreover, the angle of inclination 373A of the first tab face 373 may be in a range of about plus five degrees (+5°) to about minus thirty degrees (−30°) relative to the tab reference line 302. The angle of inclination 376A of the second tab face 376 may be in a range of about thirty to sixty degrees (30–60°) relative to the tab reference line 302.

Similar to the embodiment of FIGS. 1A, 1B and 2, the handle tab 370, via the first tab face 373 and second tab face 376, in cooperation with a retaining slot 340 prevent movement of the holding screw 330 in one direction, in this case a loosening direction, when the locking mechanism 350 is in the engaged or locked position, as shown in FIGS. 3 and 4A, and permit continuous movement of the holding screw 330 in an opposite direction whether the locking mechanism 350 is engaged or disengaged. Those of ordinary skill in the art will readily recognize that the orientation of the first and second tab faces 373 and 376 may have other orientation values and ranges relative to the pin reference line so long as the handle tab 370 in cooperation with the holding screw retaining slot 340 simultaneously prevent movement of the holding screw 330 in a loosening direction when the locking mechanism 350 is engaged, and permit movement of the holding screw 330 in a tightening direction from the engaged position.

The orientation of the first tab face 373 and second tab face 376 enable proper operation and interaction with the first and second slot walls 343 and 346 of the retaining slot 340 to enable proper operation of the locking clamp assembly 350. The retaining first tab face 373 and opposing second slot wall 343, shown in FIG. 4A, cooperate to prevent actuation of the locking mechanism 350 from the engaged position to the disengaged position. When the locking mechanism 350 is in the engaged position, the second tab face 376 and the opposing inclined second slot wall 346, shown in FIGS. 4A and 4B, cooperate to facilitate actuation of the locking mechanism 350 from the engaged position to a disengaged position. The inclined second tab face 376 in conjunction with the opposing second slot wall 346 permit the holding screw 330 to rotate in a loosening direction whether the locking mechanism 350 is engaged or disengaged.

The first tab face 373 and the slot wall 343 preferably have complimentary orientations such that they cooperate to prevent movement of the retaining first slot wall 343, and thereby prevent movement of the holding screw 330 in a loosening direction when the locking mechanism 350 is in the engaged position. The second tab face 376 and the second slot wall 346 preferably have complimentary orientations such that they cooperate to always permit movement of the holding screw 330 in a tightening direction whether the locking mechanism 350 is in an engaged or disengaged position.

The locking mechanism 350 also comprises an actuation or biasing spring operatively positioned to impart a moving or biasing force on the spring-loaded handle 360. In one embodiment, the biasing V-spring spring 500 provides a moving force that normally tends to force the upper handle end 365 and handle tab 370 towards and into the retaining slots 340 or threading 333 of the holding screw 330 to set the locking mechanism 350 in an engaged position, shown in FIGS. 4A and 5B. In the engaged position, i.e., the C-clamp locked position, the bottom spring contact section 505 is positioned to contact the upper V-spring section 510. In the disengaged position shown in FIG. 5A, i.e., the C-clamp open or un-locked position, the bottom spring contact section 505 is actuated and positioned to contact the lower V-spring section 515. The spring-loaded locking mechanism 350 is transitioned between its engaged and disengaged position by actuating the pivoting handle 360 at its lower handle end 363.

In actuating the spring-loaded locking mechanism 350 from its normally closed or engaged position, shown in FIG. 5B, the lower handle end 363 is pivoted in a downward direction toward the clamp base 320. The pivoting handle 360 motion forces the bottom spring contact section 505 to travel in a radial direction from the lower V-spring section 515 toward the upper V-spring section 510. The bottom spring contact section 505 interacts with the lower V-spring section 515 and imposes a downward force on the lower V-spring section 515 which forces the V-spring 500 to flex and move downward. In this manner, the bottom spring contact section 505 is permitted to continue to travel radially toward the upper V-spring section 510. Once the bottom spring contact section 505 passes a V-spring apex 520, the V-spring 500 is free to flex back and moves back up to an un-flexed open position, as shown in FIG. 5A. At this point, spring-loaded locking mechanism 350 is now in the open position. The spring-loaded locking mechanism 350 then automatically returns the spring-loaded locking mechanism 350 back to the engaged position when the lower end handle is released. In other embodiments, the spring-loaded locking mechanism 350 remains in the open position, until it is actuated or moved back to the engaged position, shown in FIG. 5B, by forcing the lower end handle 363 upwardly away from the clamp base 320.

When the locking mechanism 350 is engaged or locked, as shown in FIGS. 3, 4A and 5B, the handle tab 370 is positioned in a retaining slot 340 and the handle biasing spring provides a force tending to push or force the handle 350 against the retaining slot 340 or holding screw 330. In the engaged position, the locking mechanism 350 prevents movement or rotation of the holding screw 330 in a loosening direction and at the same time permits rotation of the holding screw 330 in a tightening direction.

To disengage or unlock the locking mechanism 350, the spring-loaded handle 360 is actuated via the lower handle end 363 as discussed above. The lower handle end 363 is pressed and moved toward the clamp base 320 to overcome the spring's biasing force. The lower handle end 363 pivots the spring-loaded handle 360 about the pivot rod 355 and thereby pulls the upper handle end 365 and handle tab 370 out of and away from the holding screw retaining slot 340. The extracted upper handle end 365 and handle tab 370 are then be maintained in an open or disengaged position, as shown in FIG. 4B, when the handle 360 is released. The biasing spring remains in the extended position ready to return the handle 360 back to the engaged position. In the disengaged position, the locking mechanism 350 does not obstruct movement of the holding screw 330 and permits unimpeded movement of the holding screw 330 in both a loosening or tightening direction.

To re-engage the locking mechanism 350, the lower handle end 363 is actuated and the spring biasing force is enabled to compress and return the upper handle end 365 with the handle tab 370 into the retaining slot 340 and thereby return the locking mechanism 350 back to the engaged position.

When the locking mechanism 350 is in the engaged position, the retaining slot 340 and the handle tab 370 prevent rotation of the holding screw 330 in the loosening direction. In the engaged position, the handle tab 370 is operationally positioned in the holding screw retaining slot 340. The first slot wall 343 in cooperation with the first tab face 373 prevent rotation of the holding screw 330 past the first tab face 373 which thereby maintains the locking clamp assembly 300 in a locked position. In particular, the first tab face 373 creates a physical obstruction that prevents movement of the first slot wall 343 if the holding screw 330 is moved in the loosening direction. If the holding screw 330 is rotated in a loosening direction while the locking mechanism 350 is engaged, the first slot wall 343 travels until the first slot wall 343 comes into contact with the first tab face 373. Upon contact of the opposing retaining walls 343 and 373, the first tab face 373 obstructs the first slot wall 343 and physically prevents further rotation of the retaining slot wall 343 thereby preventing the holding screw 330 from rotating further in a loosening direction. This maintains the locking mechanism 350 in the engaged position and the locking clamp assembly 300 tightly and securely installed.

Additionally, from the engaged position, the retaining slot 340 and the handle tab 370 continuously enables movement or rotation of the holding screw 330 in the tightening direction. The second slot wall 346 in cooperation with the second tab face 376 permit rotation of the holding screw 330 past the retaining slot 340 to thereby enable the locking clamp assembly 300 to be set to a new and tighter position. Tightening the locking clamp assembly 300, from an engaged position, involves rotation of the holding screw 330 in the tightening direction until the second slot wall 346 encounters an adjacent inclined second tab face 376.

Upon contact of the opposing inclined second slot wall 346 and second tab face 376, and continuing rotation of the holding screw 330, the inclined nature of the second slot wall 346 enables the second slot wall 346 to slideably travel on and impart a force on the inclined second tab face 376. As the second slot wall 346 travels along the second tab face 376, a force is imparted from the second slot wall 346 to the second tab face 376 that overcomes the force of the biasing spring and thereby pivots or pushes away the spring-loaded handle 360 such that handle tab 370 is moved out and away from the retaining slot 340. As a result, the locking mechanism 350 transitions from the engaged position to a disengaged position. The holding screw 330 can then continue to be rotated in a tightening direction. Once the second tab face 376 reaches the top of the second slot wall 346, the handle tab 370 travels or rides on the threads 333 of the holding screw 330 as the holding screw 333 continues to be rotated in the tightening direction. When the handle tab 370 reaches the next or adjacent retaining slot 340, the handle biasing spring provides a returning force such that the handle tab 370 snaps back into the retaining slot 340 returning the locking mechanism 350 to an engaged position. Repeating this process, the holding screw 330 can be rotated until the desired tightness of the locking clamp assembly 300 is achieved and the handle tab 370 resides in a retaining slot 340.

If the holding screw 330 is left in a disengaged position and not rotated to the point the next retaining slot 340 would be reached, the locking mechanism remains disengaged. Over time, the locking clamp assembly 300 may move or rotate in a loosening direction as a result of vibration, thermal cycling and/or physical shock encountered during normal operation of a device using the locking clamp assembly 300. In such a case, the locking clamp assembly 300 may move in a loosening direction and, if this movement continues, return to the previous retaining slot 340 where the handle tab 370 will snap back into the retaining slot 340 returning the locking mechanism 350 to the engaged or locked position.

The invention has been described and illustrated with respect to certain preferred embodiments by way of example only. Those of ordinary skill in the art will readily recognize that the preferred embodiments may be altered or amended without departing from the true spirit and scope of the invention. Therefore, the invention is not limited to the specific details, representative devices, and illustrated examples in this description. The present invention is limited only by the following claims and equivalents.

We claim:

1. A locking clamp assembly comprising:
   a threaded member adapted for electrically coupling a first conductor to a second conductor, the threaded member having a plurality of retaining slots traversing a cylindrical threaded portion wherein the retaining slots are spaced less than ninety degrees apart;
   a housing adapted to receive said threaded member; and
   a locking pin mounted on said housing;
   wherein said locking pin is adapted to cooperate with at least one retaining slot to prevent said locking clamp assembly from movement in a first direction while permitting movement in an opposing second direction when said locking clamp assembly is in an engaged position.

2. The locking clamp assembly of claim 1, wherein said first direction is a loosening direction and said second direction is a tightening direction.

3. The locking clamp assembly of claim 1, wherein said locking pin further comprises an engage means for selectively setting said locking clamp assembly in the engaged position.

4. A locking clamp assembly comprising:
   a clamp head adapted for electrically coupling a first conductor to a second conductor, the clamp head having a cylindrical threaded portion adapted for electrically coupling to the first conductor, a plurality of retaining slots traversing said threaded portion wherein the retaining slots are spaced less than ninety degrees apart, and a conductor coupling portion adapted for electrically coupling to the second conductor;
   a clamp housing adapted to receive said clamp head; and
   a locking pin operatively mounted on said clamp housing and adjacent to at least one retaining slot;
   said locking pin adapted to interact with at least one retaining slot to prevent said locking clamp assembly from movement in a first direction when said locking clamp assembly is in an engaged position.

5. The locking clamp assembly of claim 4, wherein said locking pin is actuated by the retaining slot to enable movement of said locking clamp assembly in a second direction when said locking clamp assembly is in the engaged position.

6. The locking clamp assembly of claim 4, wherein said locking pin further comprises an engage means for selectively setting said locking clamp assembly in the engaged position or a disengaged position.

7. The locking clamp assembly of claim 4, wherein said first direction is a loosening direction.

8. The locking clamp assembly of claim 5, wherein said second direction is a tightening direction.

9. A locking clamp assembly comprising:
  a clamp head comprising a conductor coupling portion and a cylindrical threaded head portion adapted for providing an electrical connection between a first conductor and the conductor coupling portion, the threaded head portion having a plurality of retaining slots traversing said threaded head portion wherein the retaining slots are spaced less than ninety degrees apart;
  a clamp housing having a coupling means for receiving said threaded head portion; and
  a locking mechanism operatively coupled to said clamp housing, said locking mechanism comprising,
    a tab retaining slot disposed on said clamp housing,
    a locking pin mounted on said clamp housing and adjacent to said at least one retaining slot,
    an engage tab disposed on said locking pin for positioning in said tab retaining slot to thereby set said locking mechanism in an engaged position, and
    a biasing spring disposed on said locking pin for providing a force to bias said locking pin towards the engaged position;
  wherein said locking pin in cooperation with at least one retaining slot prevents movement of said clamp housing in a loosening direction when said locking clamp assembly is in the engaged position.

10. The locking clamp assembly of claim 9, wherein said locking pin is actuated by at least one retaining slot to permit movement of said clamp mechanism in a tightening direction when said locking clamp assembly is engaged.

11. The locking clamp assembly of claim 10, wherein said locking pin further comprises a locking pin grip to facilitate movement of said engage tab from said tab retaining slot to thereby engage or disengage said locking mechanism.

12. A locking clamp assembly comprising:
  a clamp body comprising
    a base having a threaded base aperture,
    a threaded guide section aligned with said threaded base aperture, and
    at least one pivot flange extending from said base;
  a threaded holding screw having at least one retaining slot traversing said threaded clamp screw, said threaded clamp screw adapted for insertion in said threaded base aperture and threaded guide section;
  a locking mechanism operatively coupled to said clamp body, said locking mechanism comprising
    a handle comprising an upper handle end and a lower handle end, said handle pivotally coupled to said at least one pivot flange via a pivot,
    an engage tab connected to said upper handle end, and
    a biasing spring coupled to said handle and said clamp body base, said biasing spring adapted to provide a force to bias said handle towards a locking mechanism engaged position;
  wherein said engage tab cooperates with said at least one retaining slot to prevent movement of said holding screw in a loosening direction while permitting movement in an opposing tightening direction when said locking mechanism is in an engaged position.

13. The locking clamp assembly of claim 1 wherein the housing is a cylindrical housing and is a non-conductive material.

14. The locking clamp assembly of claim 13 wherein rotation of the cylindrical housing withdraws the threaded member into the housing.

15. The locking claim assembly of claim 1 wherein the threaded member is conductive.

16. The locking clamp assembly of claim 1 wherein the plurality of retaining slots are equally spaced apart.

17. The locking clamp assembly of claim 1 wherein the plurality of retaining slots are spaced forty-five degrees apart.

18. The locking clamp assembly of claim 1 wherein the threaded portion comprises at least eight retaining slots.

19. The locking clamp assembly of claim 4 wherein the clamp housing is a cylindrical housing and is a non-conductive material.

20. The locking clamp assembly of claim 19 wherein rotation of the cylindrical housing withdraws the threaded portion into the housing.

21. The locking claim assembly of claim 4 wherein the threaded portion is conductive.

22. The locking clamp assembly of claim 4 wherein the plurality of retaining slots are equally spaced apart.

23. The locking clamp assembly of claim 4 wherein the plurality of retaining slots are spaced forty-five degrees apart.

24. The locking clamp assembly of claim 4 wherein the threaded portion comprises at least eight retaining slots.

25. The locking clamp assembly of claim 9 wherein the clamp housing is a cylindrical housing and is a non-conductive material.

26. The locking clamp assembly of claim 25 wherein rotation of the cylindrical housing withdraws the threaded head portion into the housing.

27. The locking claim assembly of claim 9 wherein the threaded head portion is conductive.

28. The locking clamp assembly of claim 9 wherein the plurality of retaining slots are equally spaced apart.

29. The locking clamp assembly of claim 9 wherein the plurality of retaining slots are spaced forty-five degrees apart.

30. The locking clamp assembly of claim 9 wherein the threaded portion comprises at least eight retaining slots.

* * * * *